United States Patent [19]

Vonthien

[11] Patent Number: 4,790,168

[45] Date of Patent: Dec. 13, 1988

[54] PIPE CRIMPING AND CUTTING

[76] Inventor: Gregory W. Vonthien, "Eloura", Walbundrie, N.S.W., 2642, Australia

[21] Appl. No.: 903,155

[22] Filed: Sep. 3, 1986

[30] Foreign Application Priority Data

Sep. 9, 1985 [AU] Australia ............................. PH2329

[51] Int. Cl.⁴ ............................................ B21D 28/00
[52] U.S. Cl. ....................... 72/331; 72/326; 72/389; 83/445; 83/697; 83/928
[58] Field of Search ................ 72/325, 324, 326, 332, 72/369, 407, 464, 412, 331, 389; 29/34 R, 566.1, 33.52; 83/639, 467, 54, 581, 445, 697, 928

[56] References Cited

U.S. PATENT DOCUMENTS

| 811,174 | 1/1906 | Rice | 83/581 |
|---|---|---|---|
| 955,117 | 4/1910 | Ellis | 72/332 |
| 1,389,881 | 9/1921 | Draut | 83/581 |
| 1,450,198 | 4/1923 | Bailey | 72/407 |
| 3,073,195 | 1/1963 | Koster | 83/581 |
| 3,263,465 | 8/1966 | Way et al. | 72/294 |
| 3,495,526 | 2/1970 | Mohler et al. | 72/456 |
| 3,525,107 | 8/1970 | Hays | 72/410 |
| 3,553,999 | 1/1971 | Rommel | 72/324 |
| 3,707,895 | 1/1973 | McElderry | 83/639 |
| 3,888,105 | 6/1975 | Bert | 72/410 |
| 3,956,952 | 5/1976 | Goettel et al. | 83/581 |
| 4,194,422 | 3/1980 | Williams | 83/581 |
| 4,273,171 | 6/1981 | Spaulding, Sr. | 83/928 |

FOREIGN PATENT DOCUMENTS

| 845438 | 11/1952 | Fed. Rep. of Germany | 83/639 |
|---|---|---|---|
| 574496 | 7/1924 | France | 83/639 |
| 224209 | 12/1984 | Japan | 83/697 |
| 5732 | of 1893 | United Kingdom | 83/697 |

Primary Examiner—Daniel C. Crane
Attorney, Agent, or Firm—Merchant, Gould, Smith, Edell, Welter & Schmidt

[57] ABSTRACT

An apparatus for cutting and crimping pipe having a first jaw and a second jaw between which a pipe is placed to be crimped and/or cut. At least one of the first jaw and the second jaw is mounted for relative reciprocating movement toward and away from the other, whereby the jaws are capable of cutting and crimping pipe placed therebetween. A guide mechanism, preferably a guide plate, is disposed at an angle to the jaws for guiding a pipe placed between the jaws, whereby the pipe can be cut and crimped at an angle determined by the angle of the guide mechanism. It is preferable that the jaws have a first section provided with a mechanism for cutting and crimping pipe and a second section without a mechanism for cutting pipe whereby pipe placed in the second section may be crimped only. Preferably the first jaw is driven by a hydraulic ram.

9 Claims, 5 Drawing Sheets

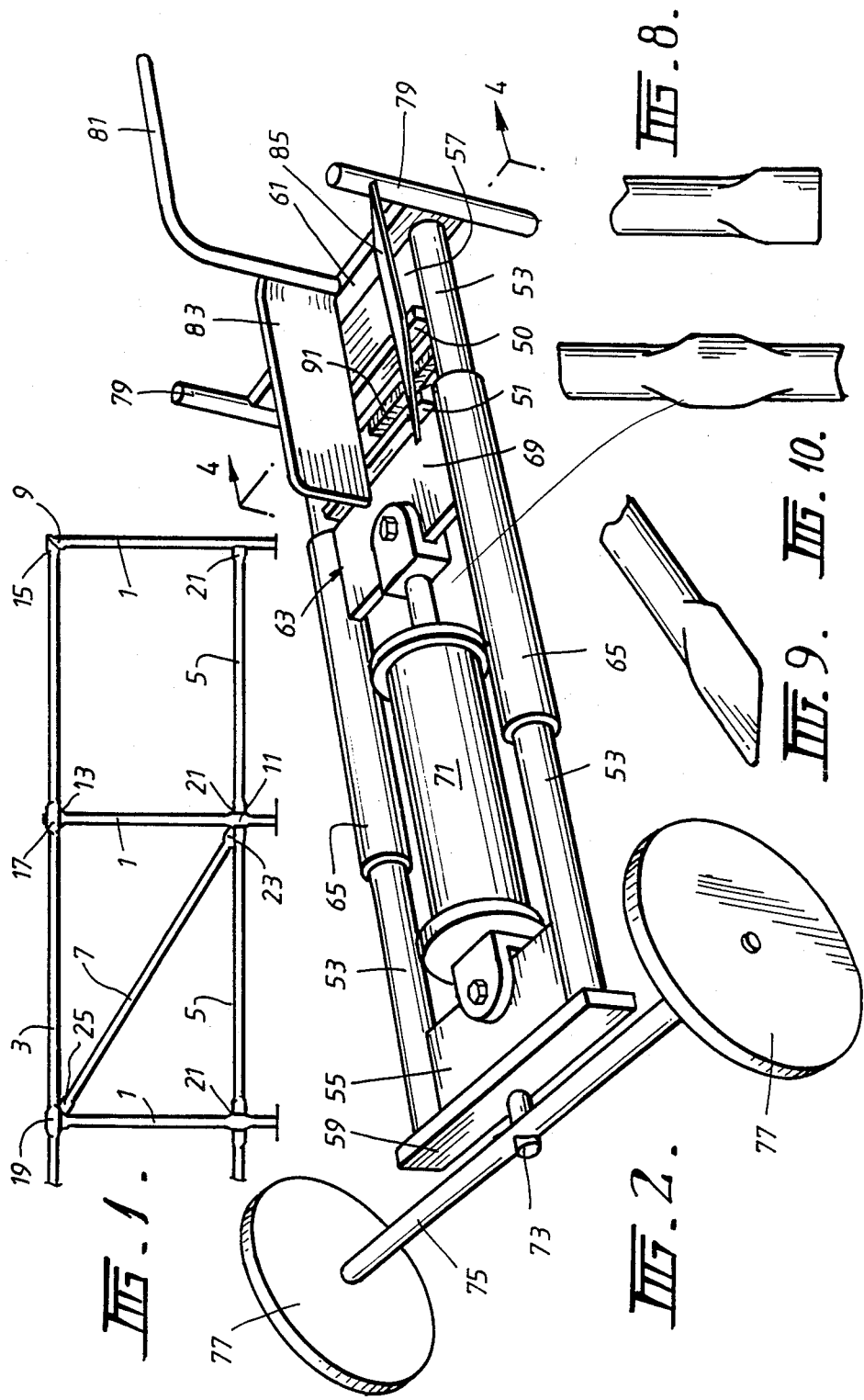

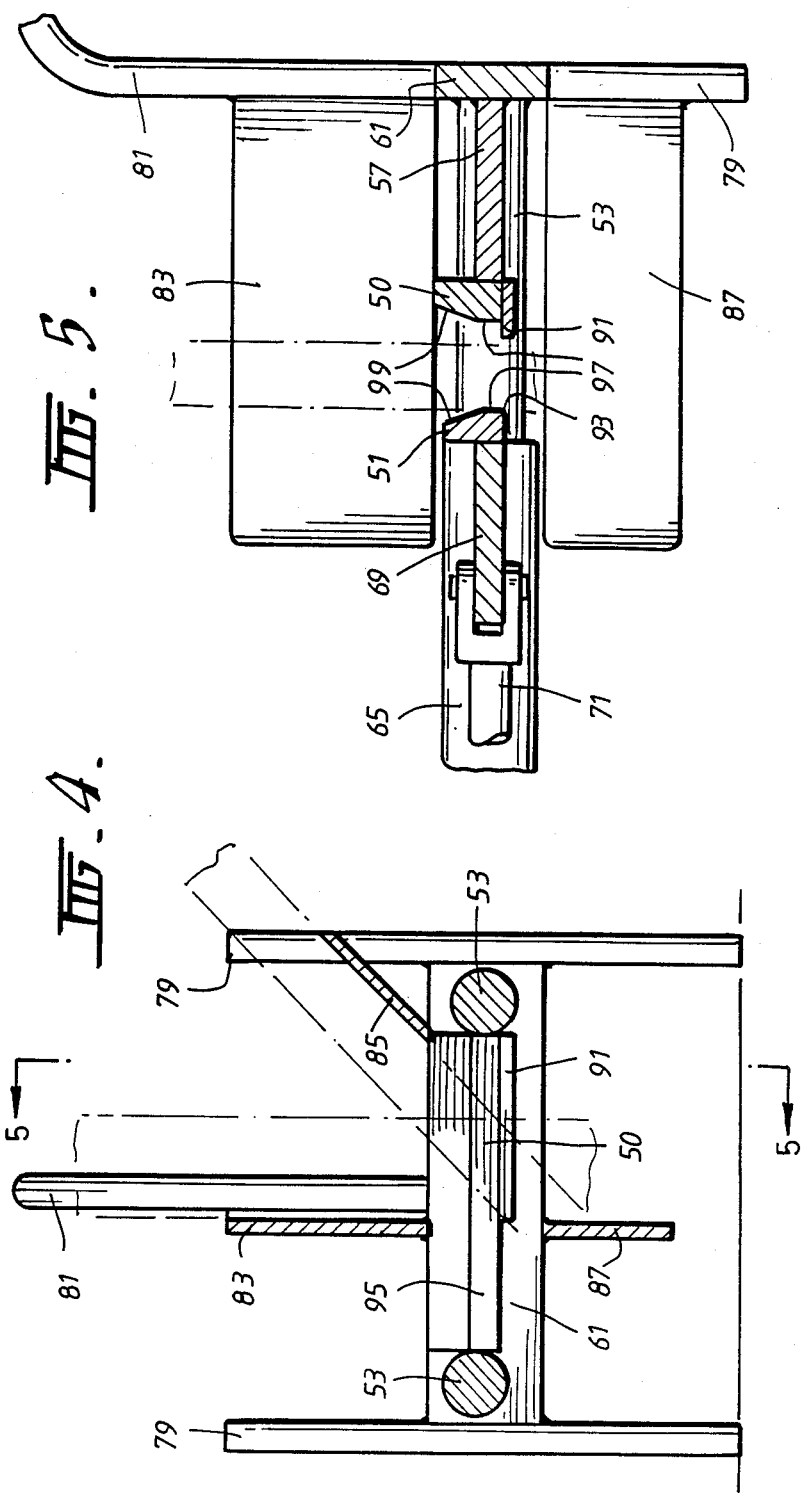

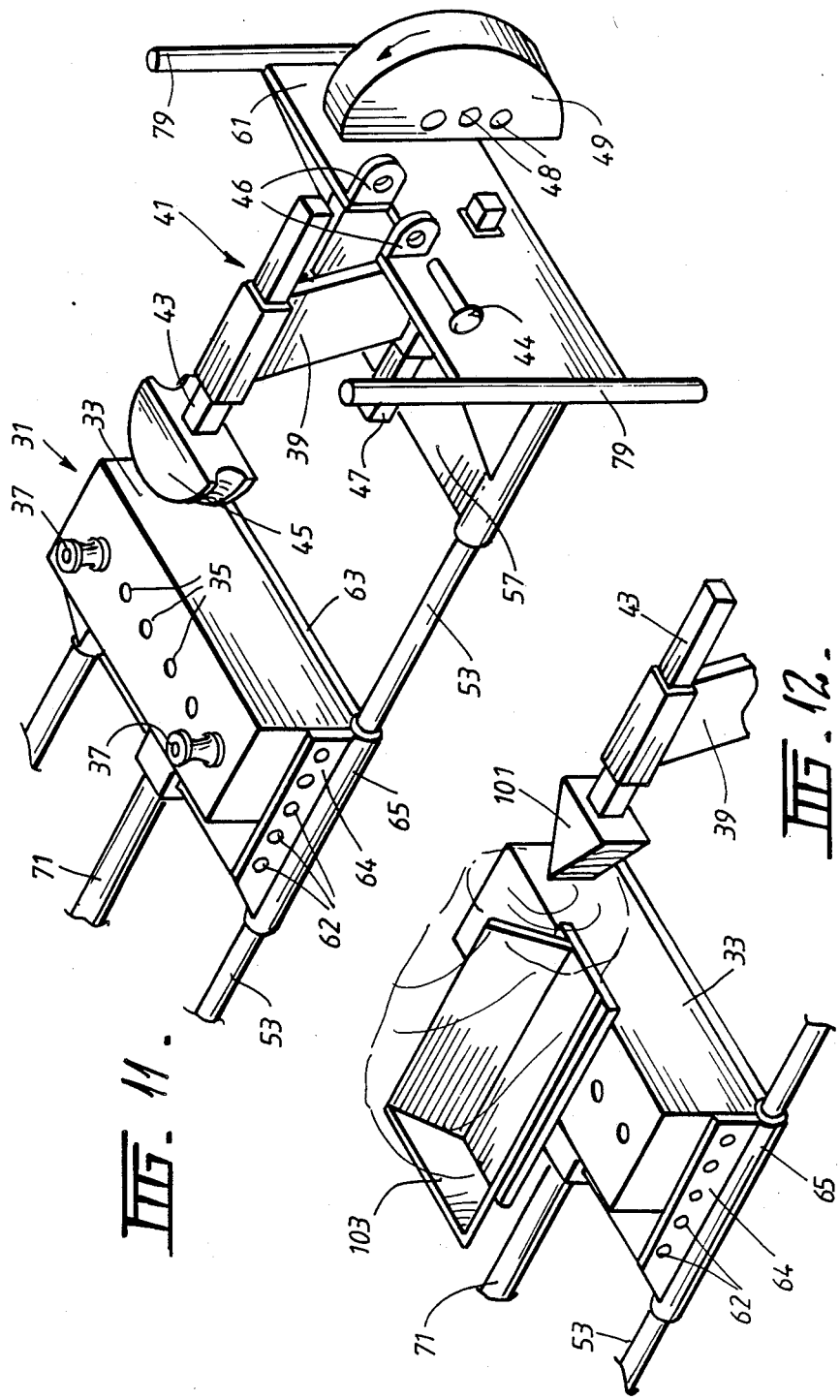

PIPE CRIMPING AND CUTTING

This invention relates to pipe crimping and cutting and relates particularly, but not exclusively, to a portable apparatus for this purpose which can be activated from the normal hydraulics connections on a tractor.

When producing steel fencing for farms it is normal to use tubular or pipe steel of approximately 38 mm. or 50 mm. diameter. The ends of the pipe are either cut square or at 45° and then crimped so as to enable good welding to a mating part of the fence. The fence is usually comprised of upright posts, horizontal runners and some inclined supporting struts which all interconnect at various points. The struts are obviously cut at 45° to enable proper connection with the posts and runners. Sometimes the runners require crimping intermediate the ends thereof so that the fence posts can be suitably connected thereto.

Out in the field, it is quite difficult for a fencer to quickly and economically provide the necessary cuts and crimps. The present invention has been devised to attempt to produce apparatus which will assist this problem.

According to a broad aspect of the present invention there may be provided an apparatus for cutting and crimping pipe, said apparatus comprising:

a first jaw and a second jaw, at least one of said jaws being mounted for relative reciprocating movement toward and away from the other, whereby said first jaw and second jaw are capable of cutting and crimping pipe placed therebetween; and guide means disposed at an angle relative to the first jaw and second jaw for guiding a pipe placed between the first jaw and second jaw, whereby a pipe can be cut and crimped at an angle determined by the angle of the guide means.

Most preferably said first jaw and second jaw have a section without cutting means so that pipe can be inserted in that section and only crimped.

Most preferably said first jaw and second jaw are mounted so that they can be angularly rotated together about a generally horizontal axis so that pipe can be introduced between the jaws either vertically or horizontally. When the pipe is long i.e. over say 2 m. in length it is desirable that it be introduced horizontally between the jaws. When the pipe is to be only crimped, it is also desirable for the pipe to be introduced horizontally between the jaws. If the pipe is shorter than say 2 m. in length then it is desirable that it be inserted vertically between the jaws so as to cut and crimp and/or only crimp. Hence the first jaw and second jaw are mounted so that they can be angularly rotated together to let the pipe be introduced in their various ways.

Desirably the jaws are moved by a hydraulic ram which can be connected to the hydraulics of a tractor.

In order that the invention can be more clearly ascertained reference will now be made to the accompanying drawings wherein:

FIG. 1 is a side view of a typical construction of fence using pipe;

FIG. 2 is a rear top perspective view of one preferred crimping apparatus;

FIG. 4 is a cross-sectional view taken along line 4—4 of FIG. 2;

FIG. 5 is a side elevational cross-sectional view taken along line 5—5 of FIG. 4;

FIG. 8 shows one type of cut and crimp which can be performed;

FIG. 9 shows a further type of cut and crimp which can be performed;

FIG. 10 shows when only a crimp is performed;

FIG. 11 is a top perspective view of a crimping apparatus with a pipe bending feature; and FIG. 12 shows the apparatus in FIG. 11 having a log-splitting feature.

Figure 3:
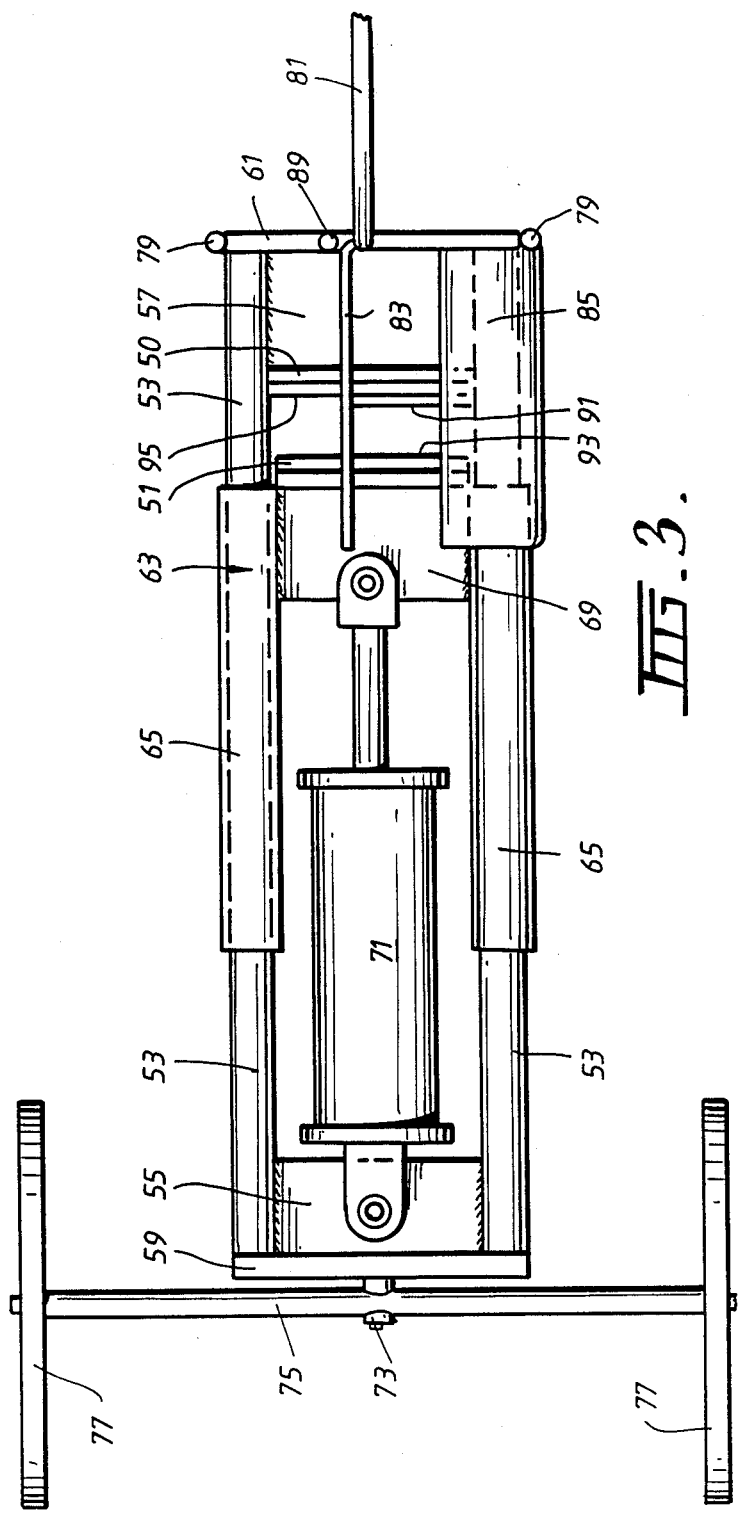
FIG. 3 is a plan view of the crimping apparatus shown in FIG. 2.

Referring firstly to FIG. 1, there is shown a typical fence arrangement. Here a fence comprises a plurality of posts 1, an upper runner 3 and lower runners 5; it also includes a diagonal strut 7. As shown, the posts 1 have different types of terminations for the connection of other parts in the fence. In particular the right hand post 1 has a 45° cut and crimped end 9. The central post 1 has a lower crimp 11 and an upper square cut and crimp 13. The left hand post 1 is of the same type as that shown for the central post 1. The upper runner 3 has its right hand end cut at 45° and crimped as shown by end 15. Above the intermediate post 1 the upper runner 3 is also crimped at 17. It is also crimped at 19 above the left hand post 1. The lower left hand runner 5 is cut square and crimped at 21 at each end. The right hand lower runner 5 is also crimped and cut square as shown by 21. The strut 7 is cut and crimped at 45° at its lower end 23 and at its upper end 25 it has two 45° cuts thereon and a single crimp. In use the cut and crimped ends or simply the crimped parts of the pipe are brought together and then welded or otherwise connected in the normal manner. Of course, it will be understood, the apparatus has wider applications other than fence construction.

Referring now to the cutting and crimping apparatus shown in the drawings and in particular to FIG. 2, it can be seen that there is provided a pair of opposed cutting jaws 50 and 51. Jaw 50 is fixedly held relative to two parallel guides 53 comprising part of a support structure. Guides 53 comprise spaced pipes. The pipes are held in spaced relationship by end plates 55 and 57. End members 59 and 61 are welded to the very ends of the guides 53. In alternative embodiments it may be preferable to attach end plates 55 and 57 and end members 59 and 61 in screw-threaded relation to guides 53 in order to allow for ease of disassembly. The guides 53 carry a sliding yoke 63 and jaw 51 in, in turn, integrally attached with the yoke 63. The yoke 63 comprises two tubular sliding members 65 and an interconnecting bridge part 69. In alternative embodiments the yoke 63 may be manufactured as an integral unit by casting or suitable machining. Means are provided in the tubular portions 65 for maintaining lubrication of the sliding surfaces with grease or other lubricants. Mountings may be provided on the yoke 63 for attachment of additional tools or components as will be described in more detail hereinafter. Accordingly, the jaws 50 and 51 can be relatively moved towards and away from each other by means of the yoke 63 sliding along the guides 53. In order to permit this movement a hydraulic ram 71 is mounted between the plate 55 and the bridge part 69. The hydraulic ram can connect with a tractor hydraulics or with any other suitable hydraulics so as to permit the relative movement of the jaws 50 and 51 as aforesaid.

End member 59 has a centrally located swivel pin 73 attached thereto and the swivel pin 73, in turn, connects with an axle 75 which supports two wheels 77. In the embodiment large wheels with the pivot at the axle height are employed, however in alternative embodiments smaller wheels with the pivot raised above the axle height may be preferable. End member 61 has two upright legs 79 attached at each side thereof. The legs 79 are arranged to extend parallel to one another and the length of the legs and the width of spacing apart of the legs is such that the jaws can be rotated about a generally horizontal axis defined by the swivel pin 73 so that the longitudinal extent of the faces of the jaws 50 and 51 can extend horizontally or vertically. The legs 79 are of a length and a spacing apart such that the longitudinal axis of each of the guides 53 is maintained substantially horizontally regardless of the angular orientation of the jaws 50 and 51. A handle 81 is attached to the end member 61 so as to facilitate (a) the angular rotation of the jaws 50 and 51 and (b) the ease in transport of the pipe crimping and cutting apparatus.

The pipe crimping and cutting apparatus shown in FIG. 2 has three guide plates attached thereto. In FIG. 2 only two of the guide plates can be clearly seen. The first of the guide plates comprises a 90° guide plate 83; the second of the guide plates comprises a 45° guide plate 85 and a third of the guide plates comprises a 90° guide plate 87 (see FIG. 4). FIG. 3 shows the apparatus of FIG. 2 in plan view and the 90° guide plate 87 can only partly be seen in this view. FIG. 3 also shows an extension handle 89 which is a tubular piece of metal used for physically inserting over the end of the handle 81 so as to provide a greater mechanical advantage when transporting the apparatus to and fro. When not in use the extension handle 89 is simply held on the plate 61 by locating over an upright pin (not clearly shown).

Referring now to FIGS. 3 and 5 it can be seen that the jaws 50 and 51 have lower cutting edges 91 and 93. The cutting edge 91 extending from jaw 50 does not extend fully across the face of the jaw 50. In other words, there is a section 95 of jaw 50 (see FIG. 3) which does not have a cutting surface. This will be explained in due course. By returning to FIG. 5 it can be seen that the cutting jaws 50 and 51 each have a crimping part 97 and a flared part 99.

Referring now to FIG. 4 it can be seen that a pipe can be introduced between the jaws 50, 51 by locating it against appropriate guide plate 83 or 85. By placing the pipe against guide plate 83 and operating the ram 71, the pipe will be cut-off square and crimped accordingly. By placing the pipe against guide plate 85 it will be cut-off at 45° and crimped accordingly. FIGS. 4 and 5 show the apparatus with the longitudinal extent of the jaws extending generally horizontally as shown in FIG. 2.

Figure 6:
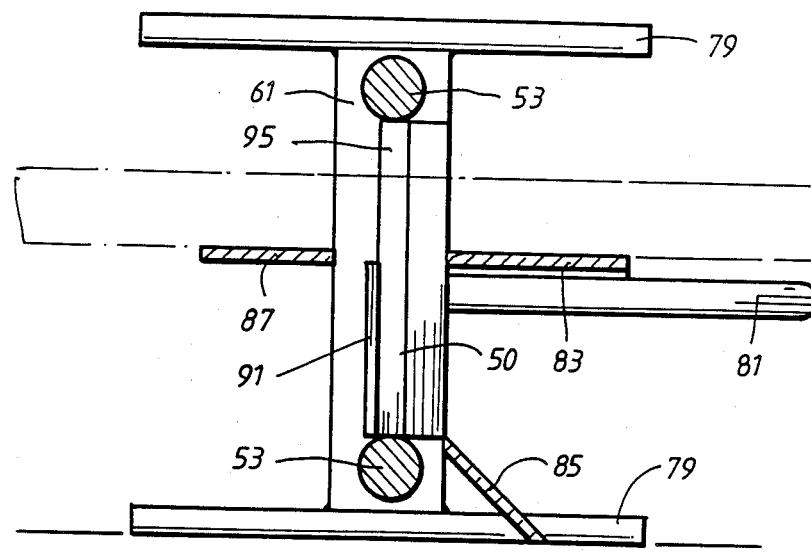
FIG. 6 is an end view showing angular rotation of the jaws.

In FIG. 6 the jaws 50 and 51 have been rotated so that the longitudinal extent of the jaws extends generally vertically i.e. the handle is rotated anti-clockwise by 90°. In this position the pipe can be passed completely between the jaws 50, 51 and placed against guide plate 87. When the ram 71 is operated the pipe will only be crimped intermediate its ends and not cut as the cutting edge 91 is not located across the pipe.

Figure 7:
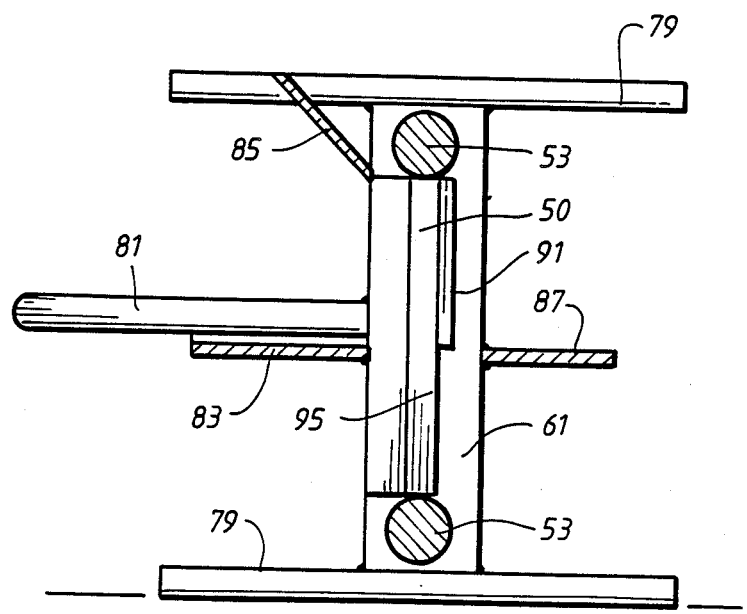
FIG. 7 is a further end view showing a different angular rotation of the jaws.

FIG. 7 shows the handle 81 angularly rotated clockwise by 90° so that the longitudinal extent of the jaws 50, 51 extends substantially vertically. In this position, pipe can be rested on top of the guide plate 83 and passed completely through the jaws 50, 51 so that the pipe can be cut intermediate its ends. This is particularly valuable when the pipe is an extremely long length of pipe, for example 6 m. in length.

Because the cutting edge 91 does not extend fully across jaw 50, when the pipe is inserted in section 95, it will only crimp and not cut the pipe. This is particularly valuable for providing crimp intermediate the ends of the pipe.

In an alternative embodiment cutting edge 91 is provided across the full width of jaw 50 and the crimping action alone is not available. Preferably cutting edge 91 is a hardened metal component which is removably mounted to the jaw 50 so as to be replaceable with new or alternative cutting or crimping edges. Although in the drawings cutting edge 91 is shown parallel to edge 93, it may be preferable to have cutting edge 91 angled relative to edge 93 in order to achieve a smoother cutting action that begins at one end.

Referring now to FIG. 8 it can be seen that the pipe has been cut squarely and crimped accordingly. FIG. 9 shows that the pipe has been cut at 45° and crimped accordingly. FIG. 10 shows that the pipe has been only crimped intermediate its ends. By appropriate double manipulated of the pipe into the apparatus a double 45° cut and crimp can be provided on the pipe for use as a strut 7, referred to previously.

Many modifications may be made to the cutting and crimping apparatus without departing from the inventive concept. For example, instead of using an hydraulic ram 71, an electrically operated solenoid mechanism could be provided. Alternatively, a purely mechanical linkage means can be provided with a suitable lever whereby a person can manually apply pressure to jaw 51 relative to jaw 50 so as to obtain the necessary cutting and crimping. In the particular hydraulic embodiment described, for the particular pipe envisaged, a pressure of approximately 2,500 pounds per square inch is required. Typically a 200 mm. travel of the ram 71 is envisaged.

In the illustrated embodiment the guides 83, 85 and 87 are shown fixed in position, however there is no reason why guide 85, for example, may not be provided pivotably attached so that other cutting angles may be achieved. In an alternative embodiment guide 85 is dispensed with and guide 83 is pivotably attached to end plate 57 so as to be adjustable from a 90° position to a variety of acute angles. Preferably such an adjustable guide is provided with means for fixing it at any desired angle.

In a further alternative embodiment the pipe cutting and crimping apparatus is provided with an additional pipe bending feature. Referring to FIG. 11, a pipe carrier 31 is attached to the yoke 63 by means of pins held in holes 62 provided in mountings 64. Pipe carrier 31 comprises an adjustable former block 33 having pipe rollers 37 mounted for rotation in holes 35 in the upper surface of the block 33. The bend angle of a pipe carried on the carrier block 33 may be adjusted by changing the spacing of rollers 37 in holes 35 and by moving the position of the carrier block 33 relative to yoke 63. In this embodiment guide 85 has been dispensed with and a guide 83 (not shown) is provided removably mounted to the end plate 57. Preferably means are provided (not shown) for pivotably mounting the guide 83 on the end plate 57. In FIG. 11 guide plate 83 has been removed and a push rod guide 39 removably mounted to end plate 57. Push rod guide 39 may be mounted to end plate 57 by screws or other means and comprises part of a means 41 for bending the pipe carried on the pipe carrier 31.

Pipe bending means 41 further comprises an upper pushrod 43 received in an upper portion of the guide 39, and carries a pipe forming head 45 at one end for engagement with pipe carried on pipe carrier 31. The upper push rod 43 is driven in the opposite direction to the direction of travel of yoke 63 by means of a cam 49. Cam 49 pivots on a pin 44 removably received in pivot point 46 welded to end member 61. A recess is cut out of end member 61 to allow cam 49 to pivot freely in an anti-clockwise direction as shown. Cam 49 is provided with several holes 48 positioned to allow variation in the distance travelled by upper pushrod 43. A lower pushrod 47 is received in a lower portion of guide 39 and transfers the motive force from yoke 63 to cam 49 and abuts against a surface of the carrier block 33.

With this arrangement of pushrods 43 and 47 and cam 49 it is possible to double the effective stroke of the ram 71 i.e. from about 200 mm to 400 mm. It will be evident that the forming head 45 can bend a pipe carried on carrier 31 to any desired angle. The increased effective stroke of ram 71 lends itself to other advantageous uses of the apparatus, for example, a log splitting feature. Referring to FIG. 12 it may be seen that pipe forming head 45 has been replaced with a log splitting wedge 101 carried on the end of pushrod 43. Pipe rollers 37 have been replaced with a log holder 103. With this arrangement a log held in holder 103 may be split by wedge 101 when ram 71 is extended to move yoke 63, the carrier block 33, and the associated pushrods. It will be evident that many other useful modifications may be made to the above arrangement by fitting other tools to the upper pushrod 43.

These and other modifications may be made without departing from the ambit of the invention the nature of which is to be determined from the foregoing description.

The claims defining the invention are as follows:

1. A portable wheeled apparatus for cutting and crimping metal pipe, of the kind used for making fences, said apparatus comprising:

a first jaw and a second jaw, said first jaw being slidably mounted on a support structure for relative movement toward and away from said second jaw, said second jaw being fixedly mounted on said support structure, said first and second jaws being capable of cutting and crimping a metal pipe placed therebetween by being inserted along a feed path into said jaws, said first and second jaws have a first section provided with means for cutting and crimping pipe, and a second section adjacent said first section provided without means for cutting pipe wherein pipe placed in said second section can be crimped only, said first and second section being oriented transverse to said feed path;

means mounted on said support structure for driving said first jaw towards said second jaw;

first guide means removably mounted on said support structure on one side of said first and second jaws at any selected angle relative to a cutting edge of said second jaw for selectively guiding a pipe placed between said first and second jaws whereby an operator can position the pipe relative to said first guide means so as to selectively cut and crimp at said selected angle; and said support structure further comprises a pair of parallel elongate members arranged horizontally in spaced relation carrying a sliding yoke therebetween and a wheel at one end of said elongate members, said first jaw being attached to said sliding yoke, and a cross member at an other end of said support structure for securing said second jaw so that movement of said sliding yoke toward said one end of said support structure enables said jaws to cooperatively move toward one another to engage a pipe selectively placed therebetween.

2. The apparatus as claimed in claim 1, further comprising a second guide means mounted on the opposite side to said one side of said first and second jaws, substantially perpendicularly to said cutting edge of said second jaw for selectively guiding a pipe placed between said first and second jaws whereby an operator can selectively position the pipe relative to said second guide means so as to effect transverse cutting and crimping of the pipe.

3. The apparatus as claimed in claim 1, wherein said first guide means comprises a guide plate that can be removably mounted at 45 degrees relative to said first and second jaws.

4. The apparatus as claimed in claim 2, wherein said second guide means comprises a guide plate mounted on said crossmember of said support structure.

5. The apparatus as claimed in claim 1, wherein said first section is provided with a cutting edge extending from a face of one of said jaws and adapted to engage with an edge of said other jaw whereby, in use, a pipe placed therebetween is subject to a shear cutting action.

6. A portable apparatus for cutting and crimping metal pipe, of the kind used for making fences, said apparatus comprising:

a first jaw and a second jaw, said first jaw being slidably mounted on a support structure for relative movement toward and away from said second jaw, said second jaw being fixedly mounted on said support structure, said first and second jaws being capable of cutting and crimping a metal pipe placed therebetween;

means mounted on said support structure for driving said first jaw towards said second jaw;

first guide means removably mounted on said support structure on one side of said first and second jaws at any selected angle relative to said first jaw and second jaw for selectively guiding a pipe placed between said first and second jaws whereby an operator can position the pipe relative to said first guide means so as to selectively cut and crimp at said selected angle;

said support structure further comprises a pair of parallel elongate members arranged horizontally in spaced relation carrying a sliding yoke therebetween, said first jaw being attached to said sliding yoke, and a cross member at one end of said support structure for securing said second jaw so that movement of said sliding yoke toward said one end of said support structure enables said jaws to cooperatively move toward one another to engage a pipe selectively placed therebetween; and said support structure is provided with legs at one end and at least one wheel at the other end whereby the apparatus can be wheeled by lifting said one end of said support structure, said support structure is pivotally mounted relative to said at least one wheel about an axis extending transverse to an axle of said wheel whereby said support structure can be pivoted about a generally horizontal axis so that a pipe can be placed between the jaw either vertically or horizontally.

7. The apparatus as claimed in claim 1, wherein said driving means comprises a hydraulic ram mounted between and parallel to said elongate members.

8. A portable apparatus for cutting and crimping metal pipe, of the kind used for making fences, said apparatus comprising:
   a first jaw and a second jaw, said first jaw being slidably mounted on a support structure for relative movement toward and away from said second jaw, said second jaw being fixedly mounted on said support structure, said first and second jaws being capable of cutting and crimping a metal pipe placed therebetween by being inserted along a feed path into said jaws, said first and second jaws have a first section provided with means for cutting and crimping pipe, and a second section adjacent said first section provided without means for cutting pipe wherein pipe placed in said second section can be crimped only, said first and second section being oriented transverse to and feed path;
   means mounted on said support structure for driving said first jaw towards said second jaw;
   first guide means removably mounted on said support stucture on one side of said first and second jaws at any selected angle relative to said first jaw and second jaw for selectively guiding a pipe placed between said first and second jaws whereby an operator can position the pipe relative to said first guide means so as to selectively cut and crimp at said selected angle;
   said support structure further comprises a pair of parallel elongate members arranged horizontally in spaced relation carrying a sliding yoke therebetween, said first jaw being attached to said sliding yoke, and a cross member at one end of said support structure for securing said second jaw so that movement of said sliding yoke toward said one end of said support structure enables said jaws to cooperatively move toward one another to engage a pipe selectively placed therebetween; and
   a second guide means mounted on the opposite side to said one side of said first and second jaws, substantially perpendicularly to said first and second jaws for selectively guiding a pipe placed between said first and second jaws whereby an operator can selectively position the pipe relative to said second guide means so as to effect transverse cutting and crimping of the pipe.

9. The apparatus as claimed in claim 8, wherein said second guide means comprises a guide plate mounted on said crossmember of said support structure.

* * * * *